(12) United States Patent
Feathergill et al.

(10) Patent No.: US 9,569,446 B1
(45) Date of Patent: Feb. 14, 2017

(54) CATALOGING SYSTEM FOR IMAGE-BASED BACKUP

(75) Inventors: David Allen Feathergill, Woodstock, IL (US); Matthew S. Hrycko, Addison, IL (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 13/156,199

(22) Filed: Jun. 8, 2011

Related U.S. Application Data

(60) Provisional application No. 61/352,745, filed on Jun. 8, 2010.

(51) Int. Cl.
*G06F 17/30* (2006.01)

(52) U.S. Cl.
CPC .............. *G06F 17/30088* (2013.01)

(58) Field of Classification Search
USPC ....................... 707/640, 651, 654
See application file for complete search history.

(56) References Cited

U.S. PATENT DOCUMENTS

| | | |
|---|---|---|
| 4,130,867 A | 12/1978 | Bachman et al. |
| 4,648,031 A | 3/1987 | Jenner |
| 4,665,520 A | 5/1987 | Strom et al. |
| 4,916,608 A | 4/1990 | Shultz |
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,414,650 A | 5/1995 | Hekhuis |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,747 A | 1/1997 | Katabami et al. |
| 5,634,052 A | 5/1997 | Morris |
| 5,640,561 A | 6/1997 | Satoh et al. |
| 5,655,081 A | 8/1997 | Bonnell et al. |
| 5,664,186 A | 9/1997 | Bennett |
| 5,721,915 A | 2/1998 | Sockut et al. |
| 5,758,356 A | 5/1998 | Hara et al. |

(Continued)

OTHER PUBLICATIONS

U.S. Appl. No. 12/566,231, filed Sep. 24, 2009, Feathergill et al.

(Continued)

*Primary Examiner* — Khanh Pham
(74) *Attorney, Agent, or Firm* — Winstead PC

(57) ABSTRACT

Examples of systems and methods for cataloging image-based backups are disclosed. In certain implementations, these systems and methods can obtain information about file system structure from a volume undergoing image-based backup. The systems and methods can generate a catalog of the file system structure that can be stored with the backup image. The systems and methods can generate a searchable index of the catalog so that users can search for files within the backup image without being required to manually mount the backup image containing the searched-for file. As a result, in certain embodiments, users advantageously can more quickly locate and restore files from image-based backups.

19 Claims, 8 Drawing Sheets

(56) References Cited

U.S. PATENT DOCUMENTS

| | | |
|---|---|---|
| 5,761,667 A | 6/1998 | Koeppen |
| 5,761,677 A | 6/1998 | Senator et al. |
| 5,774,717 A | 6/1998 | Porcaro |
| 5,778,377 A | 7/1998 | Marlin et al. |
| 5,778,392 A | 7/1998 | Stockman et al. |
| 5,796,934 A | 8/1998 | Bhanot et al. |
| 5,799,322 A | 8/1998 | Mosher, Jr. |
| 5,822,780 A | 10/1998 | Schutzman |
| 5,848,416 A | 12/1998 | Tikkanen |
| 5,893,924 A | 4/1999 | Vakkalagadda |
| 5,933,818 A | 8/1999 | Kasravi et al. |
| 5,933,820 A | 8/1999 | Beier et al. |
| 5,940,832 A | 8/1999 | Hamada et al. |
| 5,943,677 A | 8/1999 | Hicks |
| 5,948,108 A | 9/1999 | Lu et al. |
| 5,951,694 A | 9/1999 | Choquier et al. |
| 5,951,695 A | 9/1999 | Kolovson |
| 5,956,489 A | 9/1999 | San Andres et al. |
| 5,956,504 A | 9/1999 | Jagadish et al. |
| 5,978,594 A | 11/1999 | Bonnell et al. |
| 5,983,239 A | 11/1999 | Cannon |
| 5,990,810 A | 11/1999 | Williams |
| 5,991,761 A | 11/1999 | Mahoney et al. |
| 5,995,958 A | 11/1999 | Xu |
| 6,003,022 A | 12/1999 | Eberhard et al. |
| 6,016,497 A | 1/2000 | Suver |
| 6,026,412 A | 2/2000 | Sockut et al. |
| 6,029,195 A | 2/2000 | Herz |
| 6,067,410 A | 5/2000 | Nachenberg |
| 6,067,545 A | 5/2000 | Wolff |
| 6,070,170 A | 5/2000 | Friske et al. |
| 6,119,128 A | 9/2000 | Courter et al. |
| 6,122,640 A | 9/2000 | Pereira |
| 6,151,607 A | 11/2000 | Lomet |
| 6,157,932 A | 12/2000 | Klein et al. |
| 6,185,699 B1 | 2/2001 | Haderle et al. |
| 6,243,715 B1 | 6/2001 | Bogantz et al. |
| 6,253,212 B1 | 6/2001 | Loaiza et al. |
| 6,289,357 B1 | 9/2001 | Parker |
| 6,314,421 B1 | 11/2001 | Sharnoff et al. |
| 6,343,296 B1 | 1/2002 | Lakhamraju et al. |
| 6,363,387 B1 | 3/2002 | Ponnekanti et al. |
| 6,411,964 B1 | 6/2002 | Iyer et al. |
| 6,460,048 B1 | 10/2002 | Teng et al. |
| 6,470,344 B1 | 10/2002 | Kothuri et al. |
| 6,477,535 B1 | 11/2002 | Mirzadeh |
| 6,499,039 B1 | 12/2002 | Venkatesh et al. |
| 6,519,613 B1 | 2/2003 | Friske et al. |
| 6,523,035 B1 | 2/2003 | Fleming et al. |
| 6,584,474 B1 | 6/2003 | Pereira |
| 6,606,626 B1 | 8/2003 | Ponnekanti |
| 6,631,478 B1 | 10/2003 | Wang et al. |
| 6,671,721 B1 | 12/2003 | Branson et al. |
| 6,681,386 B1 | 1/2004 | Amin et al. |
| 6,691,139 B2 | 2/2004 | Ganesh et al. |
| 6,721,742 B1 | 4/2004 | Uceda-Sosa et al. |
| 6,728,780 B1 | 4/2004 | Hebert |
| 6,834,290 B1 | 12/2004 | Pugh et al. |
| 6,859,889 B2 | 2/2005 | Matsuura et al. |
| 6,907,512 B2 | 6/2005 | Hill et al. |
| 6,950,834 B2 | 9/2005 | Huras et al. |
| 6,959,441 B2 | 10/2005 | Moore |
| 7,065,538 B2 | 6/2006 | Aronoff et al. |
| 7,085,900 B2 | 8/2006 | Inagaki et al. |
| 7,093,086 B1 | 8/2006 | van Rietschote |
| 7,340,486 B1 | 3/2008 | Chapman |
| 7,370,164 B1 | 5/2008 | Nagarkar et al. |
| 7,447,854 B1 | 11/2008 | Cannon |
| 7,461,103 B2 | 12/2008 | Aronoff et al. |
| 7,546,325 B2 | 6/2009 | Kamei et al. |
| 7,610,331 B1 | 10/2009 | Genske et al. |
| 7,657,581 B2 | 2/2010 | Orenstein et al. |
| 7,669,020 B1 | 2/2010 | Shah et al. |
| 7,707,185 B1 | 4/2010 | Czezatke et al. |
| 7,752,487 B1 | 7/2010 | Feeser et al. |
| 7,765,400 B2 | 7/2010 | Costea et al. |
| 7,769,722 B1 | 8/2010 | Bergant et al. |
| 7,797,284 B1 * | 9/2010 | Chellappa ............ G06F 11/1464 707/668 |
| 7,805,423 B1 | 9/2010 | Romine et al. |
| 7,844,577 B2 | 11/2010 | Becker et al. |
| 7,849,267 B2 | 12/2010 | Lam et al. |
| 7,895,161 B2 | 2/2011 | Sugimoto et al. |
| 7,925,850 B1 | 4/2011 | Waldspurger et al. |
| 8,001,596 B2 | 8/2011 | Wollnik et al. |
| 8,010,495 B1 | 8/2011 | Kuznetzov et al. |
| 8,046,550 B2 | 10/2011 | Feathergill |
| 8,056,076 B1 | 11/2011 | Hutchins et al. |
| 8,060,476 B1 | 11/2011 | Afonso et al. |
| 8,135,930 B1 | 3/2012 | Mattox et al. |
| 8,151,263 B1 | 4/2012 | Venkitachalam et al. |
| 8,166,265 B1 | 4/2012 | Feathergill |
| 8,250,033 B1 | 8/2012 | De Souter et al. |
| 8,286,019 B2 | 10/2012 | Murase |
| 8,335,902 B1 | 12/2012 | Feathergill et al. |
| 8,412,848 B2 | 4/2013 | Therrien et al. |
| 8,429,649 B1 | 4/2013 | Feathergill et al. |
| 8,464,214 B2 | 6/2013 | Miloushev et al. |
| 8,627,198 B2 | 1/2014 | Martinsen et al. |
| 8,656,386 B1 | 2/2014 | Baimetov et al. |
| 8,856,790 B1 | 10/2014 | Feathergill et al. |
| 8,930,423 B1 | 1/2015 | Surampudi et al. |
| 2003/0145074 A1 | 7/2003 | Penick |
| 2004/0024961 A1 | 2/2004 | Cochran et al. |
| 2004/0030822 A1 | 2/2004 | Rajan et al. |
| 2004/0236803 A1 | 11/2004 | Spiegeleer |
| 2005/0114614 A1 | 5/2005 | Anderson et al. |
| 2005/0278280 A1 | 12/2005 | Semerdzhiev et al. |
| 2006/0005189 A1 | 1/2006 | Vega et al. |
| 2006/0020932 A1 | 1/2006 | Bentz et al. |
| 2006/0143501 A1 | 6/2006 | Tormasov et al. |
| 2006/0155735 A1 | 7/2006 | Traut et al. |
| 2006/0218544 A1 | 9/2006 | Chakraborty et al. |
| 2007/0208918 A1 | 9/2007 | Harbin et al. |
| 2007/0234334 A1 | 10/2007 | Araujo, Jr. et al. |
| 2007/0244938 A1 | 10/2007 | Michael et al. |
| 2007/0260831 A1 | 11/2007 | Michael et al. |
| 2008/0082593 A1 | 4/2008 | Komarov et al. |
| 2008/0155208 A1 | 6/2008 | Hiltgen et al. |
| 2008/0177994 A1 | 7/2008 | Mayer |
| 2008/0201414 A1 | 8/2008 | Amir Husain et al. |
| 2008/0244028 A1 | 10/2008 | Le et al. |
| 2008/0244577 A1 | 10/2008 | Le et al. |
| 2008/0250406 A1 | 10/2008 | Carpenter et al. |
| 2008/0256139 A1 | 10/2008 | Jessee |
| 2009/0007100 A1 | 1/2009 | Field et al. |
| 2009/0089781 A1 | 4/2009 | Shingai et al. |
| 2009/0150463 A1 | 6/2009 | Sekiguchi et al. |
| 2009/0158432 A1 | 6/2009 | Zheng et al. |
| 2009/0216816 A1 | 8/2009 | Basler et al. |
| 2009/0216970 A1 | 8/2009 | Basler et al. |
| 2009/0240904 A1 | 9/2009 | Austruy et al. |
| 2009/0265403 A1 | 10/2009 | Fukumoto |
| 2009/0300023 A1 | 12/2009 | Vaghani |
| 2010/0030983 A1 | 2/2010 | Gupta et al. |
| 2010/0049930 A1 | 2/2010 | Pershin et al. |
| 2010/0058013 A1 | 3/2010 | Gelson et al. |
| 2010/0061702 A1 | 3/2010 | Tanaka et al. |
| 2010/0070725 A1 * | 3/2010 | Prahlad et al. ............... 711/162 |
| 2010/0076934 A1 | 3/2010 | Pershin et al. |
| 2010/0077165 A1 | 3/2010 | Lu et al. |
| 2010/0088277 A1 | 4/2010 | Rao et al. |
| 2010/0115332 A1 | 5/2010 | Zheng et al. |
| 2010/0122248 A1 | 5/2010 | Robinson et al. |
| 2010/0185587 A1 | 7/2010 | Lovinger |
| 2010/0228913 A1 | 9/2010 | Czezatke et al. |
| 2010/0235813 A1 | 9/2010 | Manczak et al. |
| 2010/0235831 A1 | 9/2010 | Dittmer |
| 2010/0235832 A1 | 9/2010 | Rajagopal et al. |
| 2010/0257331 A1 | 10/2010 | Frank |
| 2010/0262585 A1 | 10/2010 | Rosikiewicz et al. |
| 2010/0262586 A1 | 10/2010 | Rosikiewicz et al. |
| 2010/0262802 A1 | 10/2010 | Goebel et al. |
| 2010/0293140 A1 | 11/2010 | Nishiyama |

(56) References Cited

U.S. PATENT DOCUMENTS

| | | |
|---|---|---|
| 2010/0306412 A1 | 12/2010 | Therrien et al. |
| 2011/0035358 A1 | 2/2011 | Naik |
| 2011/0047340 A1 | 2/2011 | Olson et al. |
| 2011/0145199 A1* | 6/2011 | Prasad Palagummi ....... 707/654 |
| 2011/0153697 A1 | 6/2011 | Nickolov et al. |
| 2011/0154325 A1 | 6/2011 | Terasaki |
| 2011/0161294 A1 | 6/2011 | Vengerov et al. |
| 2011/0225122 A1 | 9/2011 | Denuit et al. |
| 2012/0084598 A1 | 4/2012 | Alibakhsh et al. |
| 2012/0109897 A1 | 5/2012 | Janakiraman et al. |
| 2012/0210417 A1 | 8/2012 | Shieh |
| 2012/0272240 A1 | 10/2012 | Starks et al. |
| 2012/0297246 A1* | 11/2012 | Liu et al. ........................ 714/15 |
| 2013/0007506 A1 | 1/2013 | Jain et al. |
| 2013/0014102 A1 | 1/2013 | Shah |
| 2013/0097599 A1 | 4/2013 | Konik et al. |
| 2013/0151802 A1 | 6/2013 | Bahadure et al. |
| 2013/0185716 A1 | 7/2013 | Yin et al. |
| 2013/0246685 A1 | 9/2013 | Bhargava et al. |

OTHER PUBLICATIONS

U.S. Appl. No. 12/762,162, filed Apr. 16, 2010, Mattox, Jason.
U.S. Appl. No. 13/218,362, filed Aug. 25, 2011, Feathergill et al.
U.S. Appl. No. 13/244,187, filed Sep. 23, 2011, Afonso et al.
U.S. Appl. No. 13/368,240, filed Feb. 7, 2012, Naik, Dilip.
Armstrong, Ben, "How Do I Fix a Corrupted Virtual Hard Disk?", Virtual PC Guy's Blog, Jan. 7, 2009, in 4 pages.
Microsoft Corporation Technet, "Compacting Dynamically Expanding Virtual Hard Disks", retrieved Feb. 6, 2012, in 2 pages.
Microsoft Corporation Technet, "To Compact a Dynamically Expanding Virtual Hard Disk", retrieved Feb. 6, 2012, in 1 page.
Microsoft Corporation, "Microsoft Windows XP—Compact", Command-line reference A-Z, retrieved Feb. 6, 2012, in 2 pages.
Naik, Dilip, "Virtual Machine Storage—often overlooked optimizations", 2010 Storage Developer Conference, Storage Networking Industry Association, Sep. 2010, in 21 pages.
Russinovich, Mark, "SDelete v1.6", Windows Sysinternals, published Sep. 1, 2011, in 3 pages.
U.S. Appl. No. 13/368,240, filed Feb. 7, 2012, titled "Systems and Methods for Compacting a Virtual Machine File", in 44 pages.
"Data Deduplication Deep Dive, How to Put Data Storage on a Diet", InfoWorld, Mar. 2010, in 5 pages.
"The What, How and Where of Deduplication", Spectra nTier with FalconStor Deduplication, Spectra Logic Corporation, May 2008, in 12 pages.
"Quest SharePlex for Oracle," Brochure, Quest Software, Inc., Nov. 1999, 4 pages.
Space Management and Reorganization: Challenges and Solutions, http://quest.com/whitepapers/space_manager_wp.doc, published on or around Dec. 21, 1999.
"Top Five Tips for Space Management and Reorganization," believed to be published after Jul. 21, 1998, in 2 pages.
Computer Associates, "Platinum OnlineReorg Technical Overview, OnlineReorg", http://platinum.com/products/custstor/tsreorg.htm, 5 pages downloaded on Nov. 30, 1999.
Computer Associates, "Platinum Tsreorg Automates Tablespace Reorganizations, Customer Story", http://platinum.com/products/custstor/tsreorg.htm, 2 pages downloaded on Nov. 30, 1999.
Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.
Computer Associates, "Rapid Reorg for DB2 for OS/390, Brochure", http://platinum.com/products/custstor/tsreorg.htm, 3 pages downloaded on Nov. 30, 1999.
EMC Deduplication Frequently Asked Questions, http://www.datadomain.com/resources/faq.html, downloaded Jun. 7, 2011, 4 pages.
Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.
Jeff Graves, "Partition Alignment", ORCS Web Team Blog, http://www.orcsweb.com/blog, Sep. 14, 2009, pp. 1-2.
Jin, Keren et al.,"The Effectiveness of Deduplication on Virtual Machine Disk Images", SYSTOR 2009, May 2009, in 12 pages.
John Willemse, "VMware disk alignment VMDK settings and align at the 64k boundary blogSphere bug desktop enterprise microsoft server vist . . .", Planet Lotus, http://planetlotus.org/profiles/john-willemse_49586, Apr. 30, 2009, pp. 1-5 (of 44).
Joseph Pagano, paper on Microsoft Exchange Disaster Recovery Planning, document version 3.00, 1996, in 39 pages.
K. Loney, et al., "Oracle8i, DB Handbook," Oracle Press, 2000, p. 20.
L. Leverenz, et al., "Oracle8i Concepts," Oracle Corp., vol. 2, Release 8.1.5, 1999, p. 20-3.
Massiglia, Paul, "Block-Level Incremental Backup", VERITAS Software Corporation, Feb. 2000, in 13 pages.
Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.
Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.
VMware, "Recommendations for Aligning VMFS Partitions", VMware Infrastructure 3, VMware Performance Study, Feb. 2009, pp. 1-10.
VMware, Inc., "VMware Virtual Machine File System: Technical Overview and Best Practices", A VMware Technical White Paper, http://www.vmware.com/support/, 2007, Issue Version 1.0, pp. 1-19.
Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.
Kleo Bare Metal Backup, Wikipedia, retrieved from http://en.wikipedia.org/wiki/Kleo_Bare_Metal_Backup on Apr. 14, 2010, in 3 pages.
Veritas NetBackup for VMware Adminstrator's Guide, UNIX, Windows, and Linux, Release 6.5.4, Symantec Corporation, 2009, in 66 pages.
Data Sheet: Data Protection, "Symantec NetBackup 7, The Symantec NetBackup Platform: Complete protection for your information-driven enterprise," Symantec Corporation, Dec. 2009, in 8 pages.
Veeam Technology Overview, "The New Standard for Data Protection," Veeam Software, Apr. 2010, in 2 pages.
Backup Critic, "File Versus Image Backups," retrieved from http://www.backupcritic.com/software-buyer/file-verus-image on May 4, 2010, in 3 pages.
Microsoft TechNet, Windows Server 2003, retrieved from http://technet.microsoft.com/en-us/library/cc706993(WS.10,printer).aspx on Aug. 3, 2011, in 6 pages.
MSDN, Overview of Processing a Backup Under VSS, retrieved from http://msdn.microsoft.com/en-us/library/aa384589(d=printer,v=VS.85).aspx on Aug. 3, 2011, in 5 pages.
Afonso, Delano Xavier, U.S. Appl. No. 13/764,011, filed Feb. 11, 2013.

* cited by examiner

CATALOGING SYSTEM FOR IMAGE-BASED BACKUP

RELATED APPLICATION

This application claims the benefit of priority under 35 U.S.C. §119(e) of U.S. Provisional Patent Application No. 61/352,745, filed on Jun. 8, 2010, and entitled "CATALOGING SYSTEM FOR IMAGE-BASED BACKUP," the disclosure of which is hereby incorporated by reference in its entirety.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. For example, a virtualization layer, or hypervisor, can allocate the computing resources of one or more host servers into one or more virtual machines and can further provide for isolation between such virtual machines. In such a manner, the virtual machine can be a representation of a physical machine by software.

In many virtual machine implementations, each virtual machine is associated with at least one virtual machine disk or image located in one or more files in a data store. The virtual machine image can include files associated with a file system of a guest operating system. The virtual machine image can be copied, moved, backed up, or the like, similar to a general data file.

SUMMARY

This disclosure describes examples of systems and methods for cataloging image-based backups. In certain embodiments, these systems and methods obtain information about file system structure from a volume undergoing image-based backup. The systems and methods can generate a catalog of the file system structure, which can act like a content index for the files, directories, and/or folders of the file system. The systems and methods may generate a searchable index from the catalog so that users can search for files (or directories or folders) within the backup image without being required to manually mount the backup image containing the searched-for file. As a result, in certain embodiments, users advantageously can more quickly locate and restore files from image-based backups.

In certain aspects, embodiments of a system for backing up a virtual machine disk file in a virtual computing environment are disclosed. In some embodiments, the system comprises a computer system comprising computer hardware, and the computer system comprises a data store. The computer system can be programmed to implement a cataloging module and a backup module. The cataloging module can be configured to access a virtual machine disk file comprising a file system of a guest operating system of a virtual machine to obtain metadata about the file system. The metadata can comprise information about a logical structure of the file system. The cataloging module can also be configured to analyze the metadata to determine a logical hierarchy of a set of files in the file system and to analyze the metadata to determine one or more attributes of the set of files in the file system. The cataloging module can also be configured to generate a catalog comprising information about the logical hierarchy and the one or more attributes of the set of files in the file system and to store the catalog outside the virtual machine. The backup module can be configured to backup the virtual machine disk file to a backup image stored on the data store.

In some embodiments, the computer system may be further programmed to implement a restore module, which can be configured to receive a search inquiry for a file that may be included in a backup image that can be associated with a catalog. The restore module can also be configured to generate a searchable index from the catalog associated with the backup image, search the searchable index of the catalog associated with the backup image to determine matches to the search inquiry, and output information relating to the matches to the search inquiry. In some embodiments, the restore module may be further configured to receive a selection of a match to the search inquiry, mount the backup image associated with the selection of the match to the search inquiry, and restore the selection from the mounted backup image to a target. The restore module may be configured to search multiple savepoints for a file or a directory, where a savepoint can include a backup image and its associated catalog.

In certain aspects, embodiments of a method of backing up a virtual machine disk file in a virtual computing environment are disclosed. In some embodiments, the method is performed under control of a computer system comprising one or more physical computing devices. The method can comprise accessing metadata of a virtual machine disk file comprising a file system of a guest operating system of a virtual machine executing on a host server. The metadata can comprise information about a logical structure of the file system. The method can also comprise analyzing the metadata to determine a logical hierarchy of a set of files in the file system and one or more attributes of the set of files in the file system, generating a catalog comprising information about the logical hierarchy and the one or more attributes of the set of files in the file system, and storing the catalog in a persistent storage outside the virtual machine. The method can also comprise indexing the catalog to provide a searchable index and backing up the virtual machine disk file to a backup image. In some embodiments, the method can comprise filtering the metadata according to at least one filtering criterion to determine the set of files in the file system.

In certain aspects, embodiments of a computer-readable storage medium comprising computer-executable instructions configured to implement a method of backing up a virtual machine image are disclosed. In some embodiments, the method comprises accessing metadata of a virtual machine image comprising a file system of a guest operating system of a virtual machine, analyzing the metadata to determine a logical hierarchy of a set of files in the file system and one or more attributes of the set of files in the file system, generating a catalog comprising information about the logical hierarchy and the one or more attributes of the set of files in the file system, storing the catalog in a persistent storage, indexing the catalog to provide a searchable index, and backing up the virtual machine image to a backup image.

The metadata of the virtual machine file or image can comprise information about a logical or physical structure of a file system in a virtual disk file. For example, the metadata may comprise a Master File Table (MFT), inodes or vnodes, and so forth.

BRIEF DESCRIPTION OF THE DRAWINGS

Throughout the drawings, reference numbers are re-used to indicate correspondence between referenced elements.

The drawings are provided to illustrate embodiments of the inventions described herein and not to limit the scope thereof.

DETAILED DESCRIPTION

I. Introduction

Backups of virtual machine images may include two general types—file-based backups and image-based backups. A file-based backup backs up individual files of a virtual disk image. A file-based backup can allow a user to select which files of an image to back up or can automatically back up certain files. Many file-based backups provide the ability to easily search for files that were backed up. In contrast, an image-based backup can back up an entire virtual disk image. An advantage of backing up an entire image is the ability to rapidly restore an image, as opposed to individually restoring files. However, because an entire image is backed up, files cannot be easily searched for in a backup image. A user instead typically mounts a backup image and then searches for the file. If several image-based backups have been performed, the user may need to mount several different backup images before finding the desired file.

This disclosure describes examples of systems and methods for cataloging image-based backups. In certain embodiments, these systems and methods obtain information about file system structure from a volume undergoing image-based backup. The systems and methods can generate a catalog of the file system structure, which can act like a content index for the files, directories, and/or folders of the file system. The systems and methods may generate a searchable index from the catalog so that users can search for files (or directories or folders) within the backup image without being required to manually mount the backup image containing the searched-for file. As a result, in certain embodiments, users advantageously can more quickly locate and restore files from image-based backups.

II. Example Backup Systems

Embodiments of the systems and methods for cataloging image-based backups will now be described with respect to the Figures. These systems and methods are described in the context of virtual machine systems. However, it should be understood that some or all of the features described herein can be applied to image-based backups of physical systems. For example, in some implementations, a physical disk can be mounted remotely (e.g., using common internet file system (CIFS) or network file system (NFS) protocols), and the backup and cataloging operations described herein performed over a network.

Figure 1A:
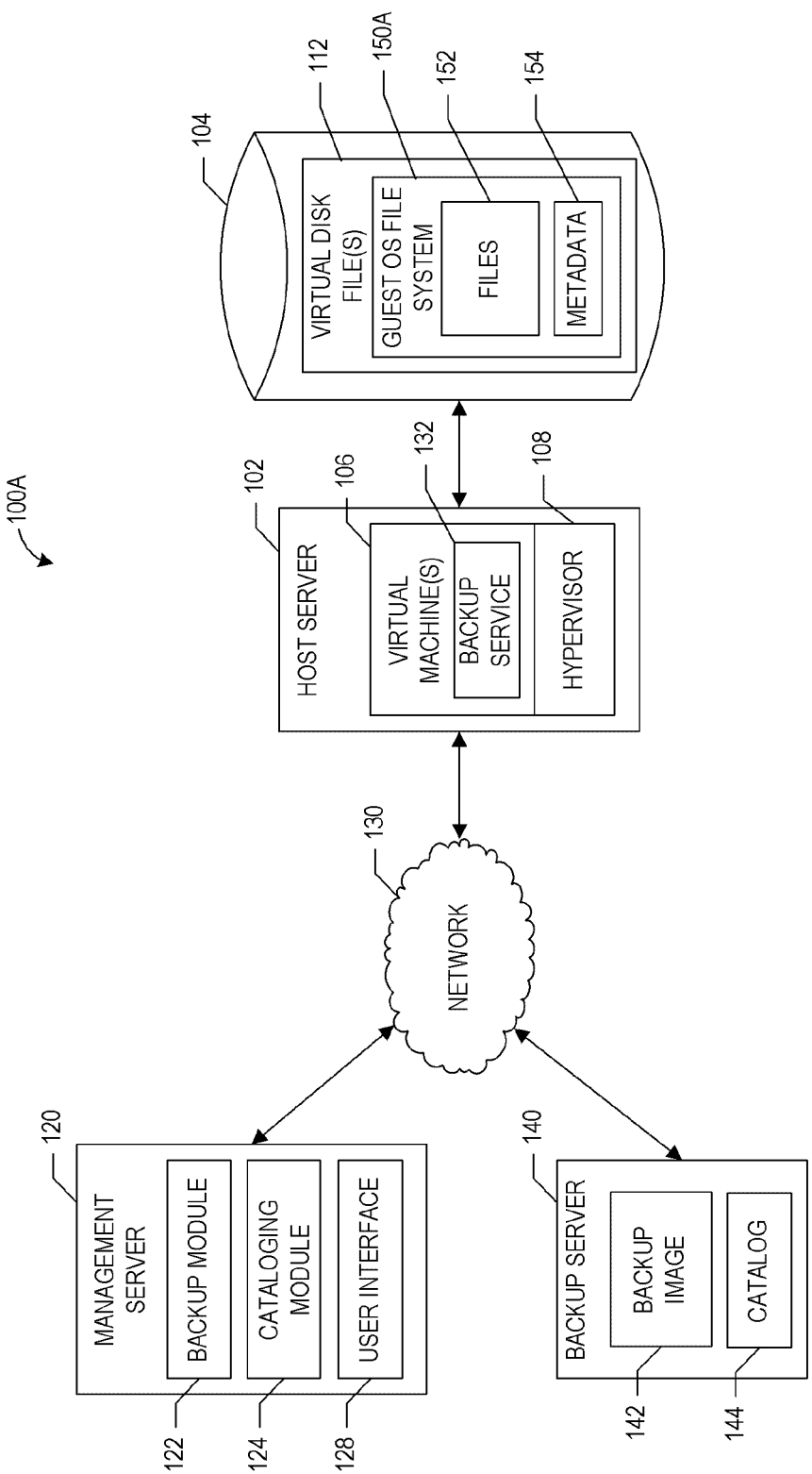
FIGS. 1A and 1B schematically illustrate embodiments of a backup system configured to perform storage operations in a virtual computing environment.

FIG. 1A illustrates an embodiment of a backup system 100A for performing storage operations in a virtual computing environment. The storage operations can include backup operations and/or restore operations. In the depicted embodiment, the backup system 100A includes a management server 120 and a backup server 140, which communicate with a host server 102 over a network 130. The host server 102 includes one or more virtual machines 106, and the host server communicates with a data store 104 that includes virtual disk files 112 of the virtual machines. Advantageously, in certain embodiments, the backup system 100A can back up a virtual machine disk file 112 (e.g., an image-based backup) to a backup image 142, while providing a catalog 144 that enables the content or files and directories of the backup image 142 to be searchable.

In certain embodiments, the virtual machine(s) 106 can use the virtual disk file 112 or virtual machine image residing on the data store 104 to store its operating system, program files, and other data associated with its activities. Example formats of virtual disk files can include Virtual Hard Disk (VHD) from Microsoft Corp. (Redmond, Wash.), Virtual Machine Disk (VMDK) from VMware, Inc. (Palo Alto, Calif.), Virtual Desktop Image (VDI) by Oracle Corporation (Redwood City, Calif.), and so forth.

As further illustrated in FIG. 1A, the backup system 100A can include a backup, or target, server 140 for storing backup files, such as a backup of one or more of the virtual disk files 112. As shown, the backup server 140 is coupled to the network 130 and can directly communicate with the management server 120. The management server 120 can cause backups of virtual disk files 112 to be stored in the backup server 140.

As shown in FIG. 1A, the network 130 can provide a wired and/or wireless communication medium between the host server 102, the management server 120 and/or the backup server 140. In certain embodiments, the network 130 includes a local area network (LAN). In yet other embodiments, the network includes one or more of the following: internet, intranet, wide area network (WAN), public network, combinations of the same or the like. In certain embodiments, the network 130 can be configured to support secure shell (SSH) tunneling or other secure protocol connections for the transfer of data between the host server(s) 102 and/or the data store(s) 104.

In certain embodiments, the host server 102 can include one or more computing devices configured to host one or more virtual machines 106 executing on top of a hypervisor 108. In certain embodiments, the hypervisor 108 can decouple the physical hardware of the host server 102 from the operating system(s) of the virtual machine(s) 106. Such abstraction allows, for example, for multiple virtual machines 106 with different operating systems and applications to run in isolation or substantially in isolation on the same physical machine.

The hypervisor 108 can include a virtualization platform that allows for multiple operating systems to run on a host computer at the same time. For instance, the hypervisor 108 can include a thin piece of software that runs directly on top of the hardware platform of the host server 102 and that virtualizes resources of the machine (e.g., a native or "bare-metal" hypervisor). In such embodiments, the virtual machine(s) 106 can run, with their respective operating systems, on the hypervisor 108 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), or the like.

In yet other embodiments, the host server 102 can include a hosted architecture in which the hypervisor 108 runs within a host operating system environment. In such embodiments, the hypervisor 108 can rely on the host operating system for device support and/or physical resource management. Examples of such hosted hypervisors can include, but are not limited to, VMWARE WORKSTATION and VMWARE SERVER by VMware, Inc. (Palo Alto, Calif.), VIRTUAL SERVER by Microsoft Corporation (Redmond, Wash.), PARALLELS WORKSTATION by Parallels, Inc. (Switzerland), or the like.

The hypervisor 108, in certain embodiments, may be capable of creating a snapshot of a virtual file system 150A and/or one or more virtual disk files 112 in order to record changes intended to such files during a certain period of time (e.g., during a backup operation). The hypervisor 108 may be capable of creating a snapshot of a virtual disk file 112 (e.g., a point-in-time copy of the entire virtual disk file 112 or a differential copy storing changes relative to a previous snapshot). The backup system 100A may perform the backup operations on the snapshot rather than on the virtual disk file 112, which can allow applications executing in the virtual machine 106 to continue writing data to the virtual disk file 112.

In certain embodiments, each virtual machine 106 can include a guest operating system and associated applications. In such embodiments, the virtual machine 106 can access the resources (e.g., privileged resources) of the host server 102 through the hypervisor 108. At least some of the machines can also include a backup service 132 in certain embodiments, which can assist with backup operations, as described below.

The host server 102 can communicate with the data store 104 to access data stored in one or more virtual machine files. For instance, the data store 104 can include one or more virtual machine file systems 110 that maintain virtual disk files or virtual machine images for some or all of the virtual machines 106 on the host server 102. In certain embodiments, the virtual machine file system 110 includes a VMWARE VMFS cluster file system provided by VMware, Inc. In such embodiments, the VMFS cluster file system enables multiple host servers (e.g., with installations of ESX server) to have concurrent access to the same virtual machine storage and provides on-disk distributed locking to ensure that the same virtual machine is not powered on by multiple servers at the same time. In other embodiments, the virtual machine file system 110 is stored on the host server 102 instead of in a separate data store.

The data store 104 can include any physical or logical storage for holding virtual machine files. The data store 104 can exist on a physical storage resource, including one or more of the following: local disks (e.g., local small computer system interface (SCSI) disks of the host server 102), a disk array, a storage area network (SAN) (e.g., fiber channel), an iSCSI disk area, network attached storage (NAS) arrays, network file system (NFS), or the like.

In the embodiment depicted in FIG. 1A, the management server 120 can include a backup module 122, a cataloging module 124, and a user interface module 128. Each of these modules can be implemented in hardware and/or software. In certain embodiments, the backup module 122 can coordinate backup operations of the virtual disk files 112 stored in the data store 104. The backup module 122 can perform image-based backups as well as possibly other types of backups (e.g., incremental or differential backups). The backup module 122 may perform shadow copy or snapshot operations. In some embodiments, the backup module 122 can coordinate with the backup service 132 within the virtual machine 106 to perform various backup operations such as, e.g., virtual disk backups in the manner described in U.S. patent application Ser. No. 12/182,364, filed Jul. 30, 2008, titled "Systems and Methods for Performing Backup Operations of a Virtual Machine," the disclosure of which is hereby incorporated by reference in its entirety. The backup systems 100A and 100B may implement additional features described in U.S. patent application Ser. No. 12/502,052, filed Jul. 13, 2009, titled "Backup Systems and Methods for a Virtual Computing Environment," the disclosure of which is hereby incorporated by reference in its entirety. In some embodiments, the backup module 122 performs backup operations without coordinating with a backup service inside the virtual machine 106.

The cataloging module 124 can access the virtual disk file 112 to obtain information about the virtual disk file's 112 file system 150A. The cataloging module 124 can use this file system information to make a searchable index of an image-based backup, as will be described in further detail below. In the example context of VMWARE systems, the cataloging module 124 can access a .VMDK virtual disk file 112 to obtain the file system information.

In certain embodiments, the cataloging module 124 can access metadata 154 of the file system to obtain the file system information. Advantageously, in certain embodiments, the metadata 154 of a file system can include a summary or description of the files and directory structure of the file system 150A. The metadata 154 of the file system 150A may describe the logical structure of the files 152, including the locations of the files in a logical hierarchy such as a directory tree. In addition, the metadata 154 can specify the physical structure of the files 152, such as the locations of the files 152 in the virtual disk file 112, the size of the files 152, and so on. In general, the term "file" may be used to generally indicate a logical unit of a file system such as, e.g., a file, a directory, a folder, and so forth.

For example, the metadata 154 may include file or directory name, creation date, access permissions, and other attributes of the file (or directory). The attributes for a file (or directory) can include information such as, e.g., file locations, allocated and/or actual file size, times for the last modification, access, or backup of the file, whether the entry is a file or a directory, a file record number (or "ID") for the file, a file record number of a parent directory, whether the file is "read only," "compressed," "encrypted," a "system file," etc., security information, and other file system attributes. Attributes can include newly added attributes when they are made available to users (e.g., in future releases of an operating system).

Different guest operating systems can include different file systems. While file systems from different operating systems are implemented differently, most file systems share the common characteristic of using metadata to describe the structure of the files. The metadata 154 for a WINDOWS-based New Technology File System (NTFS) 150A, for instance, can include a system file called a Master File Table (MFT). The MFT can be organized as a data structure or database table or tables, with a row (or record) in the MFT representing one file or directory. In some cases, the first record of the MFT describes the master file table itself.

Records for small files or directories (e.g., 512 bytes or smaller) may be contained within the MFT. Records for larger files or directories may point to data structures (e.g., B-trees) containing the file or directory information. Data about the files 152 stored in the MFT can include information such as file permissions, ownership, size, location of data, and other WINDOWS attributes.

The metadata 154 in many LINUX and UNIX-based systems include an inode or vnode for some or all of the files. The inodes (or vnodes) are data structures that can include file permissions, ownership, size, location, and status of data blocks of the file. For example, in some implementations, an inode is similar to a record in the MFT. The metadata in many Mac OS-based systems utilizing a Hierarchical File System (e.g., HFS or HFS Plus) may be stored in a HFS Catalog File. The cataloging module 124 can access the MFT on WINDOWS systems, the inodes/vnodes on UNIX/LINUX systems, and the HFS Catalog File on Mac OS systems to obtain the file system information.

In certain embodiments, the cataloging module 124 can obtain and analyze the metadata 154 of the virtual disk file 112 outside of the virtual machine 106, for example, outside of a guest operating system of the virtual machine 106. The cataloging module 124 can therefore reduce the impact of backup operations on the virtual machine 106. Alternatively, in certain embodiments, a component operating within the virtual machine 106 can obtain and/or analyze the metadata, such as an application executing in the virtual machine 106. For instance, the management server 120 can inject a lightweight binary file into the virtual machine 106 executing on the host. On WINDOWS systems, for example, the management server 120 can inject the binary using Windows Management Instrumentation (WMI) features. The binary file can then obtain and/or analyze the metadata 154 of the virtual disk file 112.

Advantageously, in certain embodiments, the cataloging module 124 can store the file system information obtained from the metadata 154 in a catalog 144. The catalog 144 can function as a content index for the files and directories of the file system in the backup image 142. The catalog 144 can include one or more databases, data structures, or the like. In some implementations, the catalog 144 may include (or be associated with) a searchable index that can enable efficient searches for content (e.g., files or directories) in the backup image 142. In other implementations, the catalog 144 may include a file (e.g., a DSV file described below) that can be imported into a database program and indexed for searching. The catalog 144 (and/or a searchable index associated with the catalog) can be stored together with, or as part of, the backup image 142. The catalog 144 can be stored on the backup server 140 or on another storage device (e.g., in a memory). The catalog 144 can preserve the file system's 150A directory structure, enabling a user to search the catalog 144 to find files in the backup image 142.

In certain embodiments, the user interface module 124 can cause the display of one or more windows for obtaining user input and/or outputting status information with respect to backup or restore operations and so forth. The user interface module 124 may display the progress of ongoing backup or restore operations, provide alerts, and so forth. The user interface module 124 may communicate notifications regarding the backup or restore operations for example, via electronic mail, text message, etc., may store logging information about the backup or restore operations, and so forth.

The user interface module 128 can provide functionality for users to search the catalog 144 for files in the backup image 142. For example, the user interface module 128 may provide a window having a search box in which a user can enter a search string (e.g., a portion of a file name). Search results (e.g., a list of backup images 142 including the search string) may be displayed. In some implementations, the user can select a search result (e.g., a particular backup image), and the user interface module 128 can display the file system (e.g., a directory tree) of the backup image. A user may select one or more of the files (or some or all of the entire directory tree) for restoring.

Figure 1B:
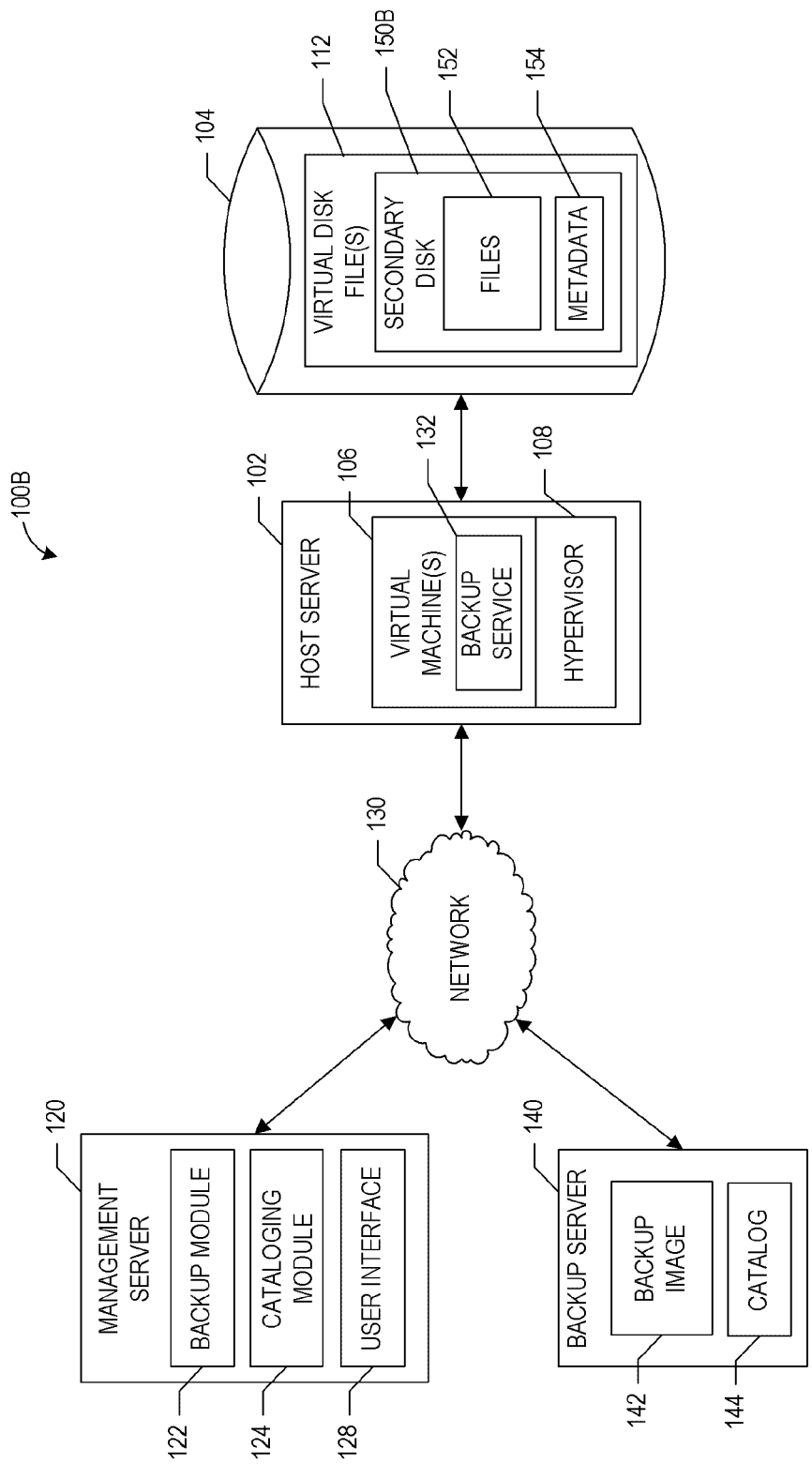

FIG. 1B illustrates another embodiment of a backup system 100B, which can provide some or all of the features of the backup system 100A. However, in the backup system 100B, the cataloging module 124 gathers cataloging information for a secondary disk 150B of the virtual disk file 112. The secondary disk 150B can include a file system structure having files 152 and metadata 154 as described above. However, in the depicted embodiment, the secondary disk 150B does not include a guest operating system. Thus, the backup system 100B illustrates that in some implementations, catalog information can be obtained from virtual disks that do not have a guest operating system.

Although the example backup systems 100A and 100B have been described with reference to particular arrangements, other embodiments can comprise more or fewer components. For example, in certain embodiments, the backup systems 100A, 100B can function without the backup server 140, and backup files can be stored to the data store 104 (or other remote data store) or a local storage device directly coupled to the management server 120 or host system 102. In various embodiments, some or all of the functionalities described herein for the management server 120 and/or the backup server 140 may be merged or separated, and performed differently than described in the illustrated embodiments.

In yet other embodiments, the host server 102 can comprise a plurality of servers in a clustered arrangement such that the computing and memory resources of the clustered servers are shared by one or more virtual machines 106. Moreover, in certain embodiments, the backup tool maintained by the management server 120 can instead reside on the host server 102 and/or the backup server 140.

III. Example Cataloging Processes

Figure 2A:
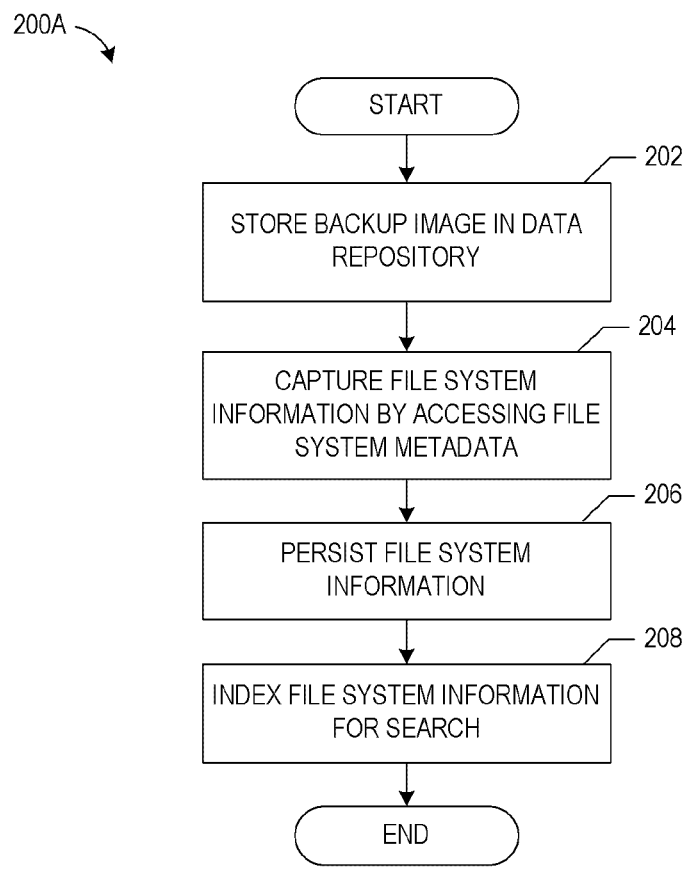
FIGS. 2A and 2B schematically illustrate examples of cataloging processes that can be implemented by embodiments of the backup system.

FIG. 2A schematically illustrates an example of a cataloging process 200A that can be implemented by the backup system 100A or 100B. In particular, in one embodiment, certain features of the cataloging process 200A are implemented by the cataloging module 124. Advantageously, in certain embodiments, the cataloging process 200A obtains and catalogs information from metadata of a file system as part of an image-based backup. For example, the metadata may be cataloged during a point-in-time capture of a backup image.

At block 202, a backup image of a virtual machine (e.g., a virtual machine disk file 112) can be transferred to and stored in a data repository. In some implementations, a snapshot of the virtual machine is taken and the snapshot is backed up. In the context of the system of FIGS. 1A and 1B, for instance, a virtual machine disk backup image 142 can be stored at the backup server 140. File system information can be captured at block 204 by accessing file system metadata. The file system information can be captured by mounting the backup image 142 (or a snapshot) and by accessing metadata (e.g., the MFT, HFS Catalog File, or inodes) in the backup image 142 (or the snapshot).

Figure 2B:
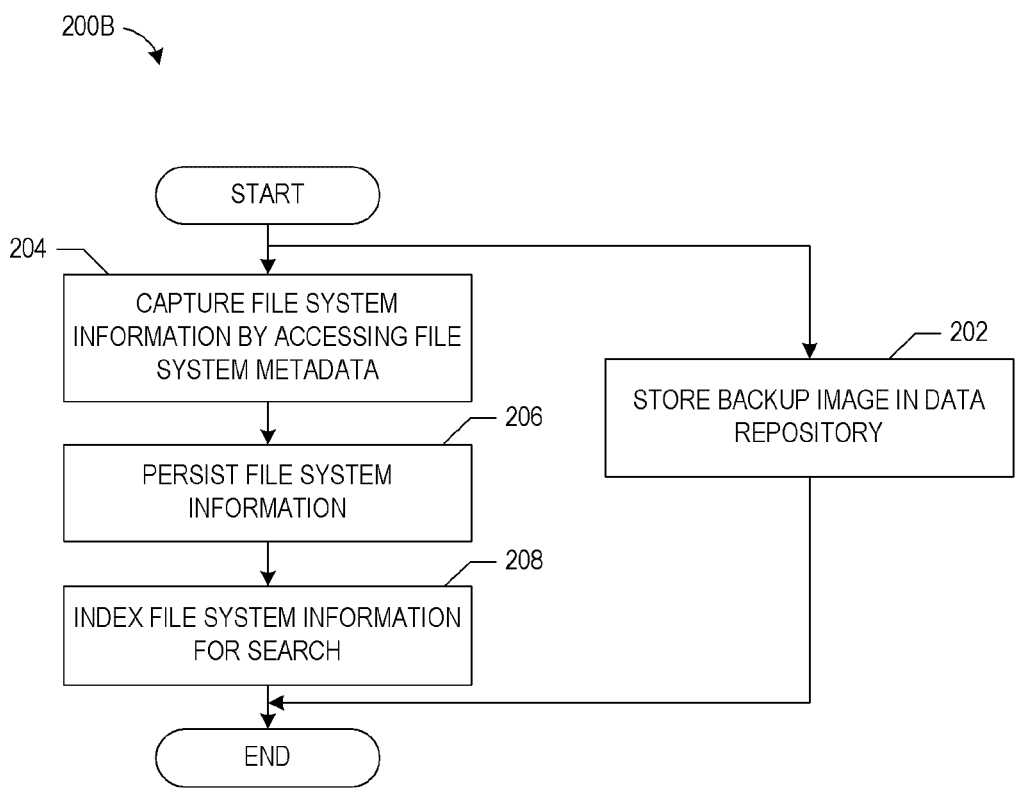
Figure 4:
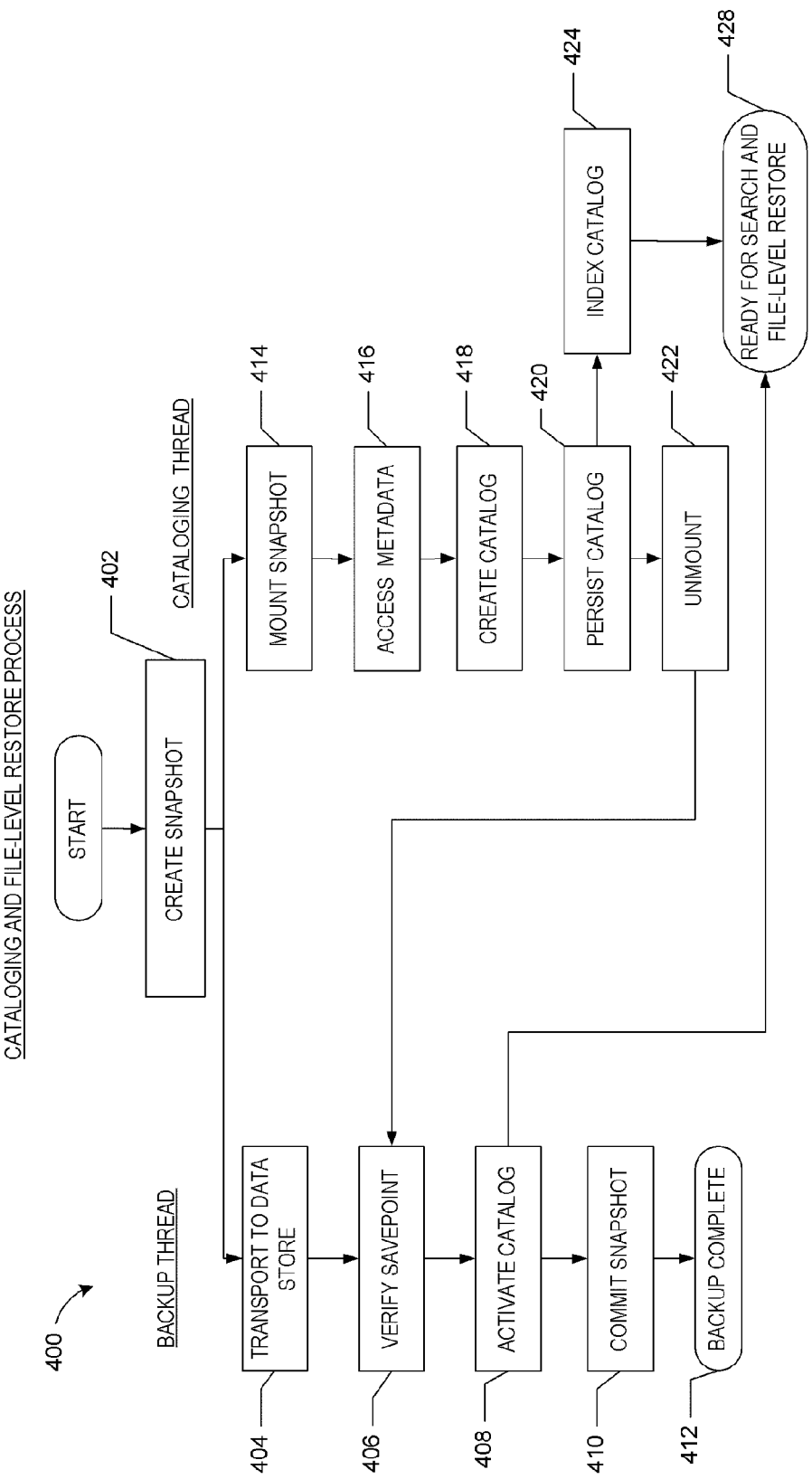
FIG. 4 schematically illustrates an example of a backup process with cataloging and file-level restore that can be implemented by embodiments of the backup system.

The file system information can be captured before, after, or in parallel with backing up the virtual machine image. For example, FIG. 2B schematically illustrates an example parallel file system capture/image backup process 200B in which the file system information is captured (e.g., via the metadata 154) while the backup is being performed. FIG. 4 schematically illustrates another example backup process 400 in which the file system information is captured while the backup image is being created. In some embodiments, the cataloging module 124 obtains the file system information prior to completing the backup of the backup image 142 to avoid mounting the backup image 142 on a central location (e.g., the backup server 140). By avoiding mounting the backup image 142 on a central location, the cataloging module 124 can distribute the load of cataloging virtual machine images, as at least some virtual disk files 112 can be indexed on separate physical servers. Cataloging the file system information prior to finishing backup operations can also allow searching to be performed before and/or while a backup is being performed.

As discussed above, in certain embodiments that catalog is generated at the time the backup image is created, and the catalog may act as a content index of some or all of the files and directories of the file system of the backup image. Each backup image may be associated with its own individualized catalog. In some embodiments, the catalog may, in effect, act as a content index that is synchronized with the content (e.g., files or directories) stored in the backup image. The catalog may be searched (e.g., directly or after import into a database program that indexes the catalog for searching) for content that may be stored in the backup image.

At block 206, the file system information can be persisted. Persisting the file system information can include storing the file system information in a catalog, such as the catalog 144 described above with respect to FIGS. 1A and 1B. The catalog may be stored in any type of computer-readable medium. In one embodiment, the catalog can be persisted in a normalized database structure that may be optimized for inserting data. The normalized database may reduce or minimize redundancy of the data, provide fewer relations with anomalies, and improve efficiency. An example process for generating a catalog will be described with reference to FIGS. 3A and 3B.

At block 208, a searchable index of the catalog can be created. Use of the searchable index can improve the speed of searches of the catalog. The index can be implemented using a variety of data structures such as, e.g., B-trees, B+-trees, bitmap indexes, hashes, etc. The searchable index can be created at least in part by denormalizing the database structure of the catalog. In some cases, the database may be flattened as much as possible, logging may be turned off, and if possible, one table may be used. In some implementations, the searchable index can be efficiently generated from the catalog by using structured query language (SQL) bulk operations.

Figure 3A:
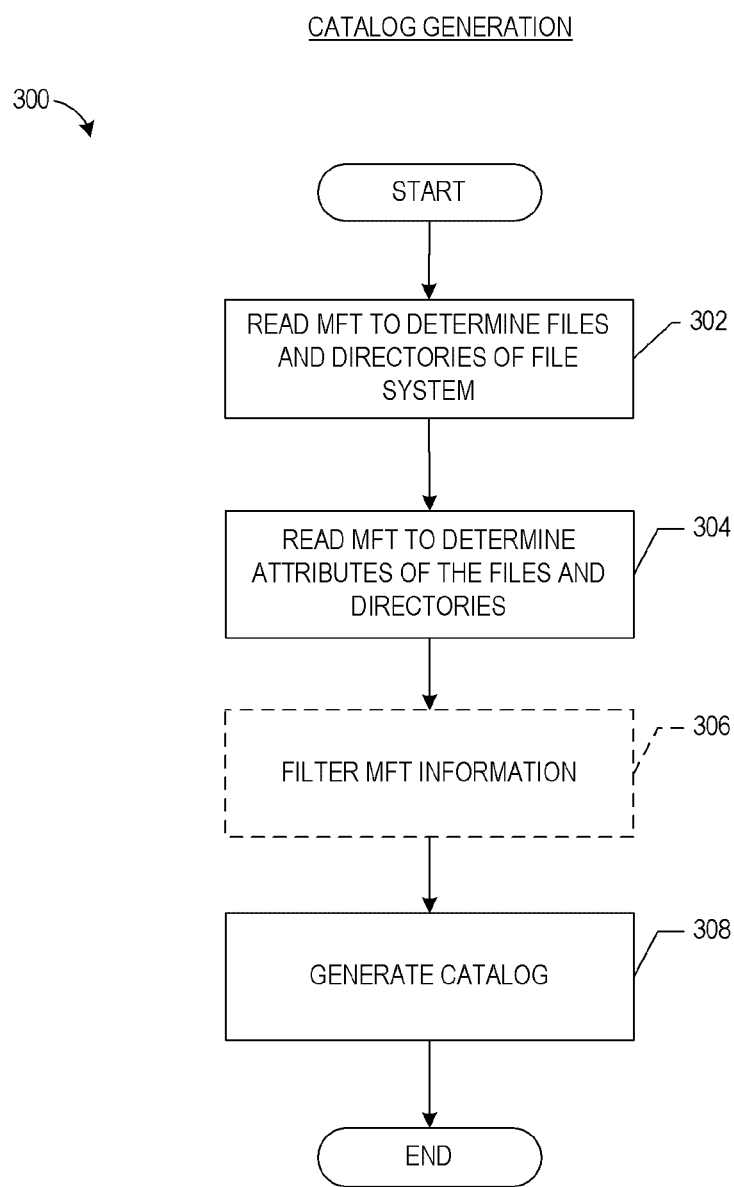
FIG. 3A schematically illustrates an example process for generating a catalog that can be implemented by embodiments of the backup system.

As discussed above, file system information can be persisted at block 206 of the cataloging processes 200A, 200B into a catalog. FIG. 3A schematically illustrates an example process 300 for generating the catalog that can be used in some implementations of the system. The example process 300 may be advantageously used for implementations in which the file system metadata does not include path information for the files and directories of the file system. In the example process 300, the metadata can be read (or iterated) one or more times to generate a catalog that includes information about the files and directories referenced in the metadata. The information can include path information relating to the path of the file or directory in the directory tree hierarchy of the file system. The path information may include a full or absolute path relative to a root directory, a path relative to a parent directory, etc. The catalog may also include attribute information about one or more attributes of the files and directories (e.g., name, size, last write time, etc.). An example format of a catalog will be discussed with reference to FIG. 3B.

The non-limiting example process 300 is described in the context of a WINDOWS NTFS system in which the file system metadata is stored in the MFT. At block 302, the MFT is read record-by-record to determine the files (and directories) referenced by the MFT. The MFT may be accessed using WINDOWS application programming interface (API) calls in some implementations. In some NTFS systems, files and directories may be identified by a file record number (FRN) representing the file (or directory) in the MFT.

At block 304, the MFT is read record-by-record a second time to determine one or more file system attributes for each of the files and directories determined at block 302. The attributes can include path information of the files and directories. For example, in some embodiments, the path information includes information about the parent directory to a file or directory (e.g., the FRN of the parent directory). In other embodiments, the path information may include the full or absolute path. Accordingly, the MFT can be accessed to build a list of files and directories and some or all of their attributes including, for example, path information for a directory tree of the file system directory.

The attributes determined at block 304 may include other attributes stored by the MFT or linked or pointed to by the MFT. As discussed above, the attributes may include file or directory name, creation date, access permissions, and other attributes of the file (or directory). The attributes for a file (or directory) can include information such as, e.g., allocated and/or actual file size, times for the last modification, access, or backup of the file, whether the entry is a file or a directory, whether the file is "read only," "compressed," "encrypted," a "system file," etc., security information, and other file system attributes. When additional or different attributes are made available to users (e.g., when a new version of an operating system is released), embodiments of the process 300 may permit determination of these additional or different attributes from the MFT.

In the example process depicted in FIG. 3A, the MFT is read (or iterated) twice. In other implementations, path information and/or other attributes of the files and directories may be extracted from a single pass through the MFT. In yet other implementations, three or more passes through the MFT may be used to extract information for the catalog.

In some embodiments, at optional block 306, the information (e.g., attributes) obtained from the MFT may be used to filter some or all of the files and directories based on one or more filter criteria. For example, the filter criteria may include timestamp attributes obtained from the MFT that are used to filter the information from the MFT to determine the files/directories that have been modified since the date of the last backup. In other implementations, the information from the MFT can be filtered in other ways. For example, the information may be filtered by file or directory path to generate a catalog of only certain directories or files, or the information may be filtered based on security information to generate a catalog of files and directories for which a user has adequate permissions. Many types of filtering based on file system attributes are possible.

At block 308, a catalog can be generated from the (optionally) filtered information retrieved in the one or more passes through the MFT. In some cases, the catalog can include all the files and directories in the file system represented in the MFT (e.g., in the case where no filtering is used or in the case where all the files/directories meet the filter constraints). In other cases, the catalog may include a subset that may be less than all the files and directories represented in the MFT (e.g., when not all of the files/directories in the MFT meet filter constraints). In some such implementations, the backup image may include all the files and directories of the virtual disk image, but the catalog would reference only a subset of these files and directories (e.g., due to the filtering). In such cases, a user may not be able to use the catalog to search for un-cataloged files or directories.

In some implementations, the catalog can be stored as a delimiter-separated values (DSV) file, such as, e.g., a comma-separated values (CSV) file, in which numbers and text are stored in a plain textual form. Lines in the DSV text file can represent rows or records of a database table, and delimiters (e.g., commas in a CSV file) in a line separate the fields in the table's row. Each row of a DSV file can be separated by a newline. Delimiters may include commas, tabs, semicolons, colons, vertical bars, spaces, or other control characters. In other implementations, the catalog may be stored as a flat file, database, data structure, etc.

Figure 3B:
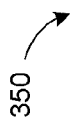
FIG. 3B schematically illustrates a portion of an example catalog.

FIG. 3B schematically illustrates a portion of an example catalog 350 stored in a CSV file format. In this example, the first row is an optional title row indicating the entries stored in the fields of the catalog. In this example, the first entry is a numeric item ID number (ItemID), the second entry is the file record number (FRN) of the file or directory, the third entry (IsDir) indicates whether the entry is a file (0) or a directory (1), the fourth entry is the FRN of the parent directory of the file or the directory (ParentFRN), the fifth entry is the name of the file or directory ("Name"), the sixth entry is the size (in bytes) of the file or directory (Size), and the seventh entry is a timestamp including the date and time when the file or directory was last written to (LastWriteTime).

The second row of the example catalog 350 references the root directory of the file system. The FRN and the ParentFRN of the root directory are the same (5, in this example). The size of directories is shown as 0 bytes in the example catalog 350. The third and fifth rows of the example catalog 350 reference directories (as can be seen by the IsDir value of 1). The fourth row references a file (IsDir value of 0).

The example catalog 350 includes path information in the form of a FRN for a file (or directory) and a FRN for the parent directory of the file (or directory). The full or absolute path to any file or directory can be determined from this information. For example, the fourth row of the catalog 350 references a file "Setup.exe" with an FRN of 73 and a ParentFRN of 65. The catalog can be consulted to determine which directory has an FRN of 65 (which is the ParentFRN of the file "Setup.exe"). From the third row of the catalog 350, it can be seen that the FRN of 65 references the directory "Admin". Thus, the information in the catalog can be used to determine that file "Setup.exe" is included in the directory "Admin." With further reference to rows 1-3 of the example catalog 350, it can be determined that the directory "Admin" (having a ParentFRN of 60) is a subdirectory of the directory "Program Files" (having a ParentFRN of 5) which is a subdirectory of the directory "I" (having a FRN of 5). Since the ParentFRN (5) of the directory "I" is equal to its FRN (5), this directory is the root directory of the file system. Thus, in this illustrative example, the full or absolute path to the file "Setup.exe" can be determined from the catalog 350 to be "/Program Files/Admin/Setup.exe." Accordingly, full or absolute paths can be constructed from FRNs and parent FRNs included in the catalog in some illustrative embodiments. In other embodiments, the full or absolute paths or other types of path information (e.g., a path relative to a home or working directory) for files and directories can be stored in the catalog. In yet other embodiments, an index for the catalog (or another file or data structure) can store some or all of the path information.

The example catalog 350 depicted in FIG. 3B is intended to be illustrative and not limiting. In other catalog embodiments, additional and/or different information (e.g., attributes) can be stored in the catalog. For example, a different set of attributes can be stored for different entries in the catalog, e.g., attributes included in the catalog for directories may be different from attributes included in the catalog for files. In other embodiments, the format of the catalog can be different than shown in FIG. 3B.

As discussed above, in some implementations, the catalog can be indexed (e.g., at block 208 of the example processes 200A, 200B). For example, a catalog in DSV file format (e.g., the example catalog 350 which is in CSV file format) can be imported into a relational database program and indexed (and/or bookmarked) for efficient searching. In some implementations, the catalog can be indexed and a searchable index may be stored with the catalog (e.g., in a persistent backup data store associated with the backup server 140). In other implementations, the catalog may be indexed after the backup is completed, for example, when a user desires to restore a file (or directory) that may be present on the backup image associated with the catalog. In some implementations, the cataloging module 124 can be configured to execute the database program.

FIG. 4 schematically illustrates an example of a backup process 400 with cataloging and file-level restore that can be implemented by embodiments of the backup systems 100A, 100B. At block 402 a snapshot of a virtual disk file is created. The virtual disk file may be the virtual disk file 112 of a virtual machine 106 described with reference to FIGS. 1A and 1B. The snapshot can be a point-in-time, read-only copy of the virtual disk file. The snapshot can include the files and memory state of the virtual machine's guest operating system, the settings and configuration of the virtual machine and its virtual hardware, etc. The snapshot may be a full copy of the virtual disk file (sometimes called a virtual disk clone), or the snapshot may be a differential or incremental copy storing changes to data relative to a previous snapshot. In some implementations, the snapshot can be stored in the data store 104.

In the example process 400, after the snapshot is created, two threads are launched and execute asynchronously. In the implementation shown in FIG. 4, the first thread is a backup thread that begins at block 404, and the second thread is a cataloging thread that begins at block 414. The two threads may be executed by the backup server 140 described with reference to FIGS. 1A and 1B. Thus, in some implementations, the backup thread and the cataloging thread execute outside the virtual machine associated with the virtual machine disk file being backed up. In other implementations, one or both of the backup and cataloging thread may execute within the virtual machine associated with the virtual machine disk file being backed up (e.g., via injection of a binary into the virtual machine).

At block 404 of the backup thread, data in the snapshot can be transported from the snapshot source (e.g., the data store 104) to a backup target such as a storage repository, e.g., a data store associated with the backup server 140. The data in the snapshot may be transported in a binary stream that does not require knowledge of the volume level structure of the virtual disk file.

At block 414 of the cataloging thread, the snapshot can be mounted to provide volume level access to the file system (and metadata) of the virtual disk file (or image) stored in the snapshot being backed up by the backup thread. In cases in which the snapshot source is locally attached to the backup server 140 (e.g., via a LAN), the snapshot may not need to be mounted at block 414. At block 416, the metadata of the file system (e.g., the metadata 154) can be accessed, and at block 418 a catalog of the file system (e.g., the catalog 144) can be generated from the metadata. As discussed above, in certain NTFS implementations, the metadata can comprise the MFT, which can be analyzed to generate the catalog (see, e.g., the example process 300 depicted in FIG. 3A). The catalog can be stored temporarily in memory or in a data store (e.g., if the catalog is too large to fit in memory) prior to being stored persistently in a backup data store.

At block 420, the catalog can be stored persistently, for example, in a backup data store associated with the backup server 140. In some cases, as discussed above, the catalog can be stored in a DSV file format suitable for importation into a database program (see, e.g., the example catalog 350 depicted in FIG. 3B). The snapshot can be unmounted at block 422. In some implementations, the snapshot can be unmounted after the catalog is stored (persistently or otherwise) but before indexing of the catalog (at block 424) is started or completed. In other implementations, the snapshot can be unmounted after the catalog is created (at block 418) and stored in memory (or a data store). For example, in some implementations, once the catalog is created, the cataloging process may have no further need for access to the file system metadata (e.g., the MFT), and the snapshot can be unmounted to free network connection resources.

The catalog can be indexed at block 424, which may advantageously provide efficient search capabilities for files or directories in the backup image. In some implementations, a searchable index can be generated at the time of the backup, and the searchable index can be stored in persistent storage with the catalog and the backup image. In other implementations, the catalog can be stored with the backup image, and a searchable index generated as part of a restore or recovery operation (which may occur at a time or times after the backup has been performed). For example, when a user desires to restore (or recover) a file or directory, the catalog may be imported into a relational database management program, which can index the catalog for searching. The user can search the index for file(s) or director(ies) that may be present in the backup image associated with the catalog as will be further described with reference to FIG. 5.

After the backup thread transports the snapshot data to the target source and after the cataloging thread unmounts the snapshot, a savepoint may be established and verified at block 406. The savepoint may include the backup image and the catalog. The savepoint may be used to restore or rollback the state of the virtual machine to the time of the snapshot. In some implementations, if the savepoint cannot be verified, the snapshot may be committed (e.g., as discussed below with reference to block 410), the catalog may be deleted, and the backup process may be automatically retried (e.g., the process 400 may return to block 402). At block 408, some implementations may synchronize the backup thread and the cataloging thread, and may activate the catalog by publishing the catalog to users of the backup system (e.g., the catalog 144 is made available to users of the system 100A, 100B). In some such implementations, the catalog may be activated after the catalog has been indexed at block 424. In other implementations, the catalog may be activated before the catalog has been indexed (or before indexing has been completed). For example, in some such implementations, a catalog may be indexed only after a user attempts to access the catalog (e.g., via the user interface module 128, for example, during a restore or recovery procedure). After the catalog is activated, the catalog and the backup virtual disk image can be available for search and file-level restore or recovery at block 428. An example process for file-level restore is described with reference to FIG. 5.

In some virtualization environments (e.g., certain VMware implementations), when a snapshot of a base virtual disk file is created, any new writes by the virtual machine are not stored in the base virtual disk file but instead stored in a delta file (sometimes called a redo log) associated with the snapshot. In some such embodiments, the changes in the delta file can be committed to the base virtual disk file and the snapshot deleted at block 410. The backup thread completes at block 412.

Multiple virtual machines can be backed up by repeating the cataloging process 200A, 200B, 400 for different virtual machine images. In one embodiment, a single catalog can be maintained for multiple virtual machine images so that users can search for a file without knowing which virtual machine image includes the file. In other embodiments, separate catalogs (and/or indexes) can be maintained for different virtual machine images. The user interface module 128 can present to the user information about the catalog (or catalogs) so that the user can search for and select a file (or files or an entire volume) to restore.

IV. Example File-Level Restore or Recovery Processes

Figure 5:
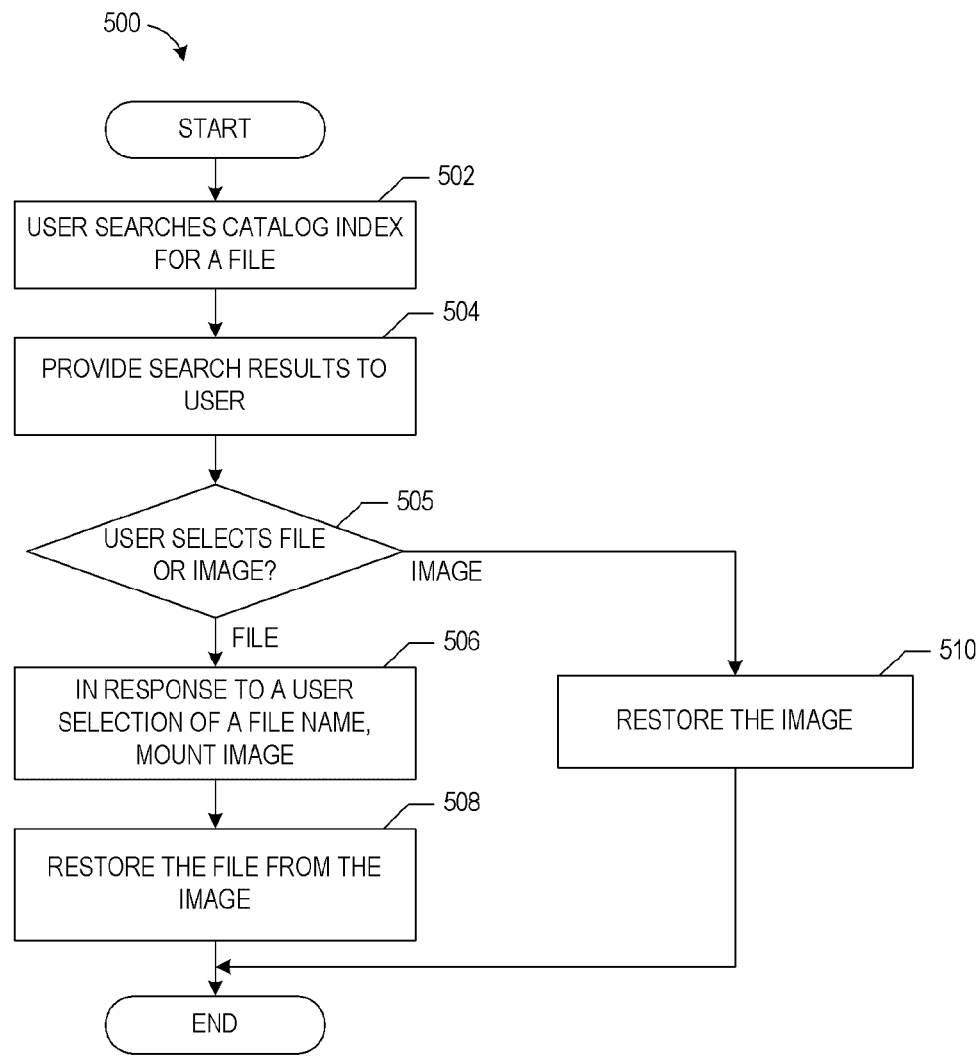
FIG. 5 schematically illustrates an example of a file-level restore or recovery process that can be implemented by embodiments of the backup system.

FIG. 5 schematically illustrates an example of a file-level restore or recovery process 500 that can be implemented by embodiments of the backup system 100A or 100B. The file-level restore process 500 can enable users to search for and restore files from an image-based backup.

At block 502, a user can search a catalog for a file (or group of files). The user may be a system administrator who manages backups or an end-user of a virtual machine. The catalog may be the catalog 144 described with reference to FIGS. 1A and 1B. Advantageously, the catalog 144 can be indexed to enable rapid and efficient searches of the catalog. For example, in some implementations, the catalog 144 can be imported into a relational database program and indexed (and/or bookmarked) for efficient searching. In other implementations, the catalog 144 itself may comprise a searchable index or be stored along with a searchable index. The user can access the catalog and/or searchable index via a user interface provided by the user interface module 128. For example, the user may enter a search string that includes a portion of the name of a desired file (or files). The search string may include wildcards in some implementations.

Advantageously, as described above, in certain embodiments the user does not need to specify which virtual machine image includes the requested file. For example, the system may be able to access one or more savepoints referencing backup images and associated catalogs (and/or associated searchable indexes). The user interface module 128 may display an indicator (e.g., an icon) that indicates which savepoint(s) include a searchable index or have been indexed to provide a searchable index. The search results can be output for display to the user by the user interface module 128.

In response to the user's search request, search results from one, some, or all of the savepoints can be provided to the user at block 504. For example, a user may search for a file (e.g., "Setup.exe") and the file may have been backed up in multiple backup disk images. The user may view the user interface to select which version of the file to restore. Since the catalog can include attributes of the files and directories, the user interface may display information about the files that help the user to determine which version of the file to restore. For example, the user interface may display a timestamp for the file (e.g., creation time, last modified time, last accessed time, etc.) to assist the user in selecting, e.g., the most recent version of the file.

At decision block 505, the user can then select a file name (or file names) in the search results, or alternatively, the user can select the entire image. In response to the user selection of a file (or files), at block 506 the backup image where the selected file is stored can be mounted. Mounting the image can include making a file system of the image accessible to the user. The file can then be restored from the image at block 508. Alternatively, the entire image can be restored instead of just the file at block 510. More generally, the user interface module 128 can provide users with the option to (or can automatically) restore one or more files, a directory, a partition, or some other subset of an image, including the full image. Accordingly, embodiments of the disclosed systems and methods can allow a user to readily search for and restore a desired file (from multiple backup images) without having to mount each backup image to determine whether the image contains the desired file. Thus, certain embodiments of the disclosed system and methods may provide certain advantages of file-based backup (e.g., easy ability to search for and restore particular files) as well as certain advantages of image-based backup (e.g., backup of an entire file system).

V. Terminology

For purposes of illustration, certain aspects, advantages and novel features of various embodiments of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure.

Depending on the embodiment, certain acts, events, or functions of any of the algorithms, methods, or processes described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, processes, methods, and algorithms described in connection with the embodiments disclosed herein can be implemented as electronic hardware, computer software, or combinations of both. To clearly illustrate this interchangeability of hardware and software, various illustrative components, blocks, modules, operations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of volatile or non-volatile computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for backing up a virtual machine disk file in a virtual computing environment, the system comprising:
a computer system comprising computer hardware, the computer system comprising a data store, the computer system programmed to implement a cataloging module, a backup module, and a restore module, wherein:
the cataloging module is configured to, for each virtual machine disk file of a plurality of virtual machine disk files:
access the virtual machine disk file comprising a file system of a guest operating system of a virtual machine to obtain metadata about the file system, the metadata comprising information about a logical structure of the file system;
analyze the metadata to determine a logical hierarchy of a set of files in the file system;
analyze the metadata to determine one or more attributes of the set of files in the file system;
generate a catalog comprising information about the logical hierarchy and the one or more attributes of the set of files in the file system, the catalog comprising a computer-enabled searchable index of at least one of a plurality of image-based backups, wherein the computer-enabled searchable index performs automated file searches within the plurality of image-based backups without manually mounting a backup image containing a searched-for file;
wherein each image-based backup of the plurality of image-based backups is associated with a unique catalog; and
store the catalog outside the virtual machine;
the backup module is configured to, for each virtual machine disk file of the plurality of virtual machine disk files:
backup the virtual machine disk file to a backup image stored on the data store; and
the restore module is configured to:
enable a user to search the catalogs for a desired file from a virtual machine image-based backup from outside the virtual machines and without specifying which virtual machine image includes the desired file; and
wherein the computer system is programmed to concurrently and asynchronously execute the cataloging module in a first thread and the backup module in a second thread different from the first thread, wherein the cataloging module is configured to determine the logical hierarchy of the at least some files in the file system in a first pass through the metadata and to determine the one or more attributes of the at least some files in the file system in a second pass through the metadata; and
wherein the first thread and the second thread are executed by a backup server outside the virtual machine associated with the virtual machine disk file.

2. The system of claim 1, wherein the set of files includes at least one file and at least one directory of the file system.

3. The system of claim 1, wherein a first processor is programmed to execute the cataloging module and the backup module, and a second processor is programmed to execute the virtual machine, the first processor different from the second processor.

4. The system of claim 1, wherein the cataloging module is configured to store the catalog in the data store.

5. The system of claim 1, wherein the computer system is programmed to execute the cataloging module and the backup module outside the virtual machine.

6. The system of claim 1, wherein the metadata comprises a master file table (MFT).

7. The system of claim 1, wherein the virtual machine disk file comprises a snapshot of a base virtual machine disk file, the snapshot comprising a point-in-time copy of the base file.

8. The system of claim 7, wherein the backup module is further configured to establish a savepoint, the savepoint comprising the backup image and the catalog.

9. The system of claim 1, wherein the set of files includes all the files and directories of the file system.

10. The system of claim 1, wherein the catalog or the computer-enabled searchable index includes path information for the set of files in the file system.

11. The system of claim 1, wherein the restore module is configured to:
receive a search inquiry for a file that may be included in a backup image, the backup image associated with a catalog;
generate a searchable index from the catalog associated with the backup image;
search the searchable index of the catalog associated with the backup image to determine matches to the search inquiry; and
output information relating to the matches to the search inquiry.

12. The system of claim 11, wherein the restore module is further configured to:
receive a selection of a match to the search inquiry;
mount the backup image associated with the selection of the match to the search inquiry; and
restore the selection from the mounted backup image to a target.

13. The system of claim 11, wherein the computer system is programmed to implement a database module, and to generate the computer-enabled searchable index from the catalog associated with the backup image:
the restore module is configured to import the catalog into the database module; and
the database module is configured to generate the computer-enabled searchable index.

14. A method of backing up a virtual machine disk file in a virtual computing environment, the method comprising:
under control of a computer system comprising one or more physical computing devices, for each virtual machine disk file of a plurality of virtual machine disk files:
accessing metadata of the virtual machine disk file, the virtual machine disk file comprising a file system of a guest operating system of a virtual machine executing on a host server, the metadata comprising information about a logical structure of the file system;

analyzing the metadata to determine a logical hierarchy of a set of files in the file system and one or more attributes of the set of files in the file system;

filtering the metadata based on at least one filter criterion to determine the set of files in the file system;

generating a catalog comprising information about the logical hierarchy and the one or more attributes of the set of files in the file system, the catalog comprising a computer-enabled searchable index of at least one of a plurality of image-based backups, wherein the computer-enabled searchable index performs automated file searches within the plurality of image-based backups without manually mounting a backup image containing a searched-for file;

wherein each image-based backup of the plurality of image-based backups is associated with a unique catalog;

storing the catalog in a persistent storage outside the virtual machine;

backing up the virtual machine disk file to a backup image;

the computer system enabling a user to search the catalogs for a desired file from a virtual machine image-based backup from outside the virtual machines and without specifying which virtual machine image includes the desired file;

wherein the computer system is programmed to concurrently and asynchronously execute a first thread and a second thread;

wherein the first thread comprises a cataloging thread that is configured to determine the logical hierarchy of the at least some files in the file system in a first pass through the metadata and to determine the one or more attributes of the at least some files in the file system in a second pass through the metadata;

wherein the second thread comprises the backing up; and wherein the first thread and the second thread are executed by a backup server outside the virtual machine associated with the virtual machine disk file.

15. The method of claim 14, wherein backing up the virtual machine disk file comprises storing the backup image in the persistent storage.

16. The method of claim 14, wherein analyzing the metadata comprises reading the metadata a plurality of times.

17. The method of claim 14, further comprising:

wherein the virtual machine disk file comprises a snapshot of a base virtual machine disk file, the snapshot comprising a point-in-time copy of the base virtual machine disk file; and establishing a savepoint, the savepoint comprising the backup image and the catalog.

18. The method of claim 14, further comprising:

searching the computer-enabled searchable index to find a match to a user inquiry for a file that may be stored in the backup image; and if a match is found, restoring the file from the backup image to a target destination.

19. A computer-readable storage medium comprising computer-executable instructions configured to implement a method of backing up a virtual machine image, the method comprising:

for each virtual machine image of a plurality of virtual machine images:

accessing metadata of the virtual machine image, the virtual machine image comprising a file system of a guest operating system of a virtual machine, the metadata comprising information about a logical structure of the file system;

analyzing the metadata to determine a logical hierarchy of a set of files in the file system and one or more attributes of the set of files in the file system;

filtering the metadata based on at least one filter criterion to determine the set of files in the file system;

generating a catalog comprising information about the logical hierarchy and the one or more attributes of the set of files in the file system, the catalog comprising a computer-enabled searchable index of at least one of a plurality of image-based backups, wherein the computer-enabled searchable index performs automated file searches within the plurality of image-based backups without manually mounting a backup image containing a searched-for file;

wherein each image-based backup of the plurality of image-based backups is associated with a unique catalog;

storing the catalog in a persistent storage;

backing up the virtual machine image to a backup image;

enabling a user to search the catalogs for a desired file from a virtual machine image-based backup from outside the virtual machines and without specifying which virtual machine image includes the desired file;

wherein the computer-executable instructions launch a first thread and a second thread that execute concurrently and asynchronously;

wherein the first thread comprises a cataloging thread that is configured to determine the logical hierarchy of the at least some files in the file system in a first pass through the metadata and to determine the one or more attributes of the at least some files in the file system in a second pass through the metadata;

wherein the second thread comprises the backing up; and wherein the first thread and the second thread are executed by a backup server outside the virtual machine associated with a virtual machine disk file.

\* \* \* \* \*